US011115832B2

(12) United States Patent
An et al.

(10) Patent No.: US 11,115,832 B2
(45) Date of Patent: Sep. 7, 2021

(54) METHOD AND DEVICE FOR NETWORK DESIGN IN WIRELESS COMMUNICATION SYSTEM

(71) Applicant: Samsung Electronics Co., Ltd., Suwon-si (KR)

(72) Inventors: Jaesung An, Suwon-si (KR); Sungbum Park, Seoul (KR); Soonyoung Lee, Seoul (KR); Minsung Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/484,628

(22) PCT Filed: Mar. 13, 2017

(86) PCT No.: PCT/KR2017/002665
§ 371 (c)(1),
(2) Date: Aug. 8, 2019

(87) PCT Pub. No.: WO2018/147502
PCT Pub. Date: Aug. 16, 2018

(65) Prior Publication Data
US 2019/0357056 A1 Nov. 21, 2019

(30) Foreign Application Priority Data
Feb. 10, 2017 (KR) .......................... 10-2017-0018868

(51) Int. Cl.
*H04W 16/18* (2009.01)
(52) U.S. Cl.
CPC .................................. *H04W 16/18* (2013.01)
(58) Field of Classification Search
CPC .................................................... H04W 16/18
See application file for complete search history.

(56) References Cited

U.S. PATENT DOCUMENTS

| 5,649,286 A * | 7/1997 | Frerking ............... H04W 60/04 |
| | | 455/435.1 |
| 6,389,294 B1 | 5/2002 | Sipila |
| 9,131,403 B1 | 9/2015 | Courchesne et al. |

(Continued)

FOREIGN PATENT DOCUMENTS

| KR | 10-2011-0006805 A | 1/2011 |
| KR | 10-2012-0026292 A | 3/2012 |

(Continued)

OTHER PUBLICATIONS

Henry L. Bertoni et al., "UHF Propagation Prediction for Wireless Personal Communications", Proceedings of the IEEE, vol. 82, No. 9, Sep. 1994, p. 1333-1359 (Year: 1994).*

(Continued)

*Primary Examiner* — Benjamin H Elliott, IV
*Assistant Examiner* — Nevena Zecevic Sandhu
(74) *Attorney, Agent, or Firm* — Jefferson IP Law, LLP

(57) ABSTRACT

Disclosed are a communication technique of merging, with IoT technology, a 5G communication system for supporting a data transmission rate higher than that of a 4G system, and a system therefor. The disclosure can be applied to intelligent services (for example, smart home, smart building, smart city, smart car or connected car, health care, digital education, retail, security and safety related services, and the like) on the basis of 5G communication technology and an IoT-related technology. According to an embodiment of the present disclosure, a network design method of a wireless communication system comprises the steps of: setting at least one environmental element related to millimeter wave (mmWave) propagation, on the basis of image information within a set map; grouping a design area within the map into at least one detailed area; and designing a network.

13 Claims, 20 Drawing Sheets

(56) References Cited

U.S. PATENT DOCUMENTS

| | | | |
|---|---|---|---|
| 2011/0281526 A1 | | 11/2011 | Matsuda et al. |
| 2012/0062419 A1 | | 3/2012 | Yoon |
| 2013/0185024 A1 | * | 7/2013 | Mahasenan ........... H04W 16/18 703/1 |
| 2013/0281100 A1 | | 10/2013 | Lanzo et al. |
| 2015/0023369 A1 | * | 1/2015 | Hui ........................ H04B 1/713 370/463 |
| 2015/0126179 A1 | * | 5/2015 | Lerbour ................ H04W 24/10 455/422.1 |
| 2017/0041806 A1 | | 2/2017 | Randall et al. |
| 2017/0142595 A1 | * | 5/2017 | Ljung ................... H04W 16/24 |

FOREIGN PATENT DOCUMENTS

| | | | |
|---|---|---|---|
| KR | 10-2012-0037138 A | | 4/2012 |
| KR | 20120037138 A | * | 4/2012 |
| WO | 98/47244 A2 | | 10/1998 |
| WO | 98/47244 A3 | | 10/1998 |
| WO | 2012/089268 A1 | | 7/2012 |

OTHER PUBLICATIONS

Mustafa Riza Akdeniz et al., "Millimeter Wave Channel Modeling and Cellular Capacity Evaluation", IEEE Journal On Selected Areas in Communications, vol. 32, No. 6, Jun. 2014, p. 1164-1179 (Year: 2014).*

Qian (Clara) Li et al., "Validation of a Geometry-Based Statistical mmWave Channel Model Using Ray-Tracing Simulation", 2015 IEEE 81st Vehicular Technology Conference (VTC Spring) (Year: 2015).*

Sangkyu Baek et al., "A Study on Correlation Properties of Shadow Fading of Millimeter Wave Frequency Spectrum", 2016 13th IEEE Annual Consumer Communications & Networking Conference (CCNC) (Year: 2016).*

Sooyoung Hur et al., "28 GHz Channel Modeling Using 3D Ray-Tracing in Urban Environments", 2015 9th European Conference on Antennas and Propagation (EuCAP) (Year: 2015).*

Tapan K. Sarkar et al., "A Survey of Various Propagation Models for Mobile Communication", IEEE Antennas and Propagation Magazine (vol. 45, Issue: 3, Jun. 2003), p. 51-82 (Year: 2003).*

Zhengqing Yun et al: "Radio propagation modeling in complex environments for wireless communications", Microwaves, Communications, Antennas and Electronics Systems, 2009. COMCAS 2009. IEEE International Conference On, IEEE, Piscataway, NJ, USA, Nov. 9, 2009 (Nov. 9, 2009), pp. 1-4, XP031614693, ISBN: 978-1-4244-3985-0.

Extended European Search Report dated Jan. 28, 2020, issued in European Application No. 17895550.6-1231.

* cited by examiner

FIG. 10
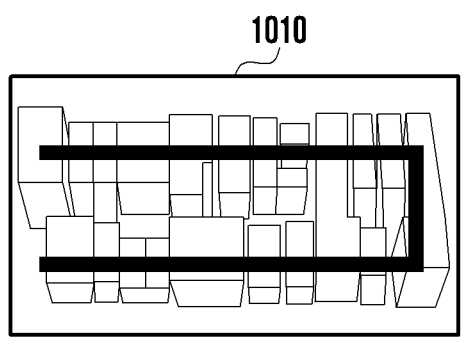
'ㄷ' SHAPE
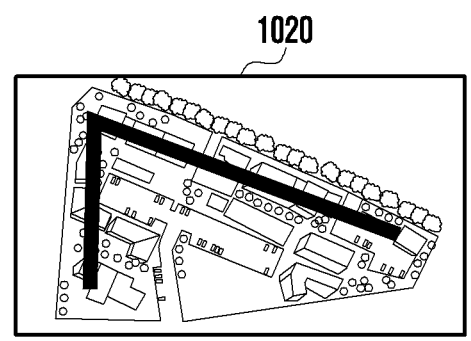
'ㅅ' SHAPE
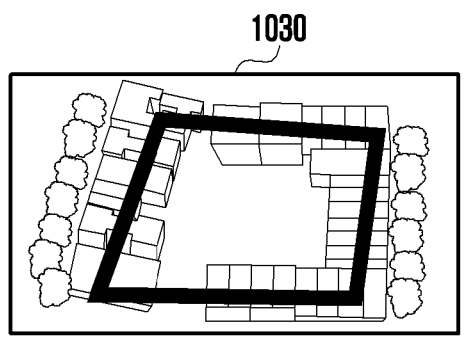
'ㅁ' SHAPE
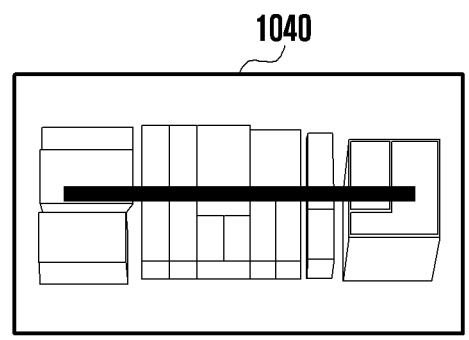
'―' SHAPE

FIG. 15B

| Building Layout Templates | Foliage Layout Templates | Road Shape Templates | REGION # |
|---|---|---|---|
| ∧ | Low | Straight | |
| | | Curved | |
| | | Mixed | |
| | Mid | Straight | |
| | | Curved | |
| | | Mixed | 3, 5 |
| | High | Straight | |
| | | Curved | |
| | | Mixed | |
| ▫ | Low | Straight | 6 |
| | | Curved | |
| | | Mixed | |
| | Mid | Straight | |
| | | Curved | |
| | | Mixed | |
| | High | Straight | |
| | | Curved | |
| | | Mixed | |
| − | Low | Straight | |
| | | Curved | |
| | | Mixed | |
| | Mid | Straight | 1, 2 |
| | | Curved | |
| | | Mixed | |
| | High | Straight | |
| | | Curved | |
| | | Mixed | |
| ⊏ | Low | Straight | |
| | | Curved | |
| | | Mixed | |
| | Mid | Straight | |
| | | Curved | |
| | | Mixed | |
| | High | Straight | |
| | | Curved | |
| | | Mixed | |

METHOD AND DEVICE FOR NETWORK DESIGN IN WIRELESS COMMUNICATION SYSTEM

TECHNICAL FIELD

The disclosure relates to a method and apparatus for considering actual environmental factors for designing networks in a wireless communication system.

This study has been carried out with the support from the "Giga KOREA Project" of the Ministry of Science, ICT, and Future Planning.

BACKGROUND ART

Since the commercial deployment of 4G communication systems, efforts have been made to develop improved 5G or pre-5G communication systems to meet the ever increasing demand for wireless data traffic. As such, 5G or pre-5G communication systems are also called "beyond 4G network" or "post LTE system". To achieve higher data rates, 5G communication systems consider utilization of the mmWave band (e.g., 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like. In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

Meanwhile, the Internet is evolving from a human centered network where humans create and consume information into the Internet of Things (IoT) where distributed elements or things process and exchange information. There has also emerged the Internet of Everything (IoE) technology that combines IoT technology with big data processing technology through connection with cloud servers. To realize IoT services, base technologies related to sensing, wired/wireless communication and network infrastructure, service interfacing, and security are needed, and technologies interconnecting things such as sensor networks, machine-to-machine (M2M) or machine type communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO, and array antennas. Application of cloud RANs to big data processing described above may be an instance of convergence of 5G communication technology and IoT technology.

As such, a method is required for estimating the channel environment and designing networks in the 5G communication system. Through network design, to enable network services over wireless communication in a particular area, the location of a transmitter (Tx) that transmits radio frequency (RF) signals and configuration values for transmission can be determined, various information on RF signals at the location of a receiver (Rx) can be identified, the channel environment can be analyzed based on mathematical modeling techniques or ray tracing simulation results, and thus the optimal Tx location can be determined. In this way, various RF signal information (e.g., path loss, coverage) can be provided for analyzing the channel environment, and the network design can be performed based on the provided information. According to an embodiment, mathematical modeling techniques may include empirical modeling techniques.

FIG. 1 illustrates network design using a mathematical modeling technique.

In FIG. 1, the transmitters 110 and 120 may form transmission beams 112 and 122 to transmit signals.

In such a mathematical modeling technique, RF information can be predicted by use of a function explicitly represented through specific signal transmission and reception modeling based on the frequency and distance of a transmission signal. As shown in the figure, each transmitter 110 or 120 can form beams 112 or 122 in three directions, and the RF characteristics of a transmission signal can be applied through the modeling technique. In this way, the RF information can be predicted through the mathematical modeling technique with a small amount of calculation, but the accuracy of such modeling may be poor for high frequency RF signals.

To analyze the channel characteristics of high frequency RF signals, a simulation technique using ray tracing can be considered. Here, the channel environment can be analyzed in consideration of the possible paths along which the RF signal can be transmitted. However, this can increase the amount of computation, and a method is needed that can reflect the actual environment in the simulation to ensure accuracy.

DISCLOSURE OF INVENTION

Technical Problem

Accordingly, embodiments of the disclosure are to provide a method and apparatus that enable reliable network design by grouping design regions in consideration of actual environmental factors.

Solution to Problem

According to an embodiment of the disclosure, there is provided a method for network design in a wireless communication system. The method may include: configuring at least one environmental factor related to millimeter wave (mmWave) propagation based on image information in a map; grouping design regions in the map into one or more subregions based on the at least one environmental factor; and performing network design according to the grouped subregions.

The at least one environmental factor may include the building layout, the foliage density, and the road shape.

The at least one environmental factor may include first characteristic information of a first object and second characteristic information of a second object.

Grouping design regions in the map may include: grouping the design regions into first subregions based on the first characteristic information; and grouping the first subregions into second subregions based on the second characteristic information.

The design regions may be grouped into the first subregions according to at least one template for the first object, and the first subregions may be grouped into the second subregions according to at least one template for the second object. The at least one template for the first object may be determined based on the first characteristic information, and the at least one template for the second object may be determined based on the second characteristic information.

Performing network design may include: identifying the characteristics of a signal transmitted from a transmission point to a reception point in the wireless communication system based on the grouped subregions; and designing a network of the wireless communication system based on the identified signal characteristics.

The image information may be determined based on at least one of two-dimensional map information or three-dimensional map information.

In one embodiment, there is provided a storage medium storing a program that includes instructions configured to implement the above method.

According to an embodiment of the disclosure, there is provided an apparatus for network design in a wireless communication system. The apparatus may include: a transceiver configured to transmit and receive information; and a controller configured to configure at least one environmental factor related to millimeter wave propagation based on image information in a map, group design regions in the map into one or more subregions based on the at least one environmental factor, and perform network design according to the grouped subregions.

Advantageous Effects of Invention

According to an embodiment of the disclosure, the method and apparatus can enable reliable network design by grouping design regions in consideration of actual environmental factors. In addition, the method and apparatus can save time, manpower, and material resources in network design by grouping the remaining regions in consideration of the grouped regions.

BRIEF DESCRIPTION OF DRAWINGS

FIG. 10 illustrates templates of the building layout according to an embodiment of the disclosure.

FIGS. 15A and 15B illustrate a process of grouping design regions further by considering the road shape templates shown in FIG. 14.

MODE FOR THE INVENTION

Figure 1:
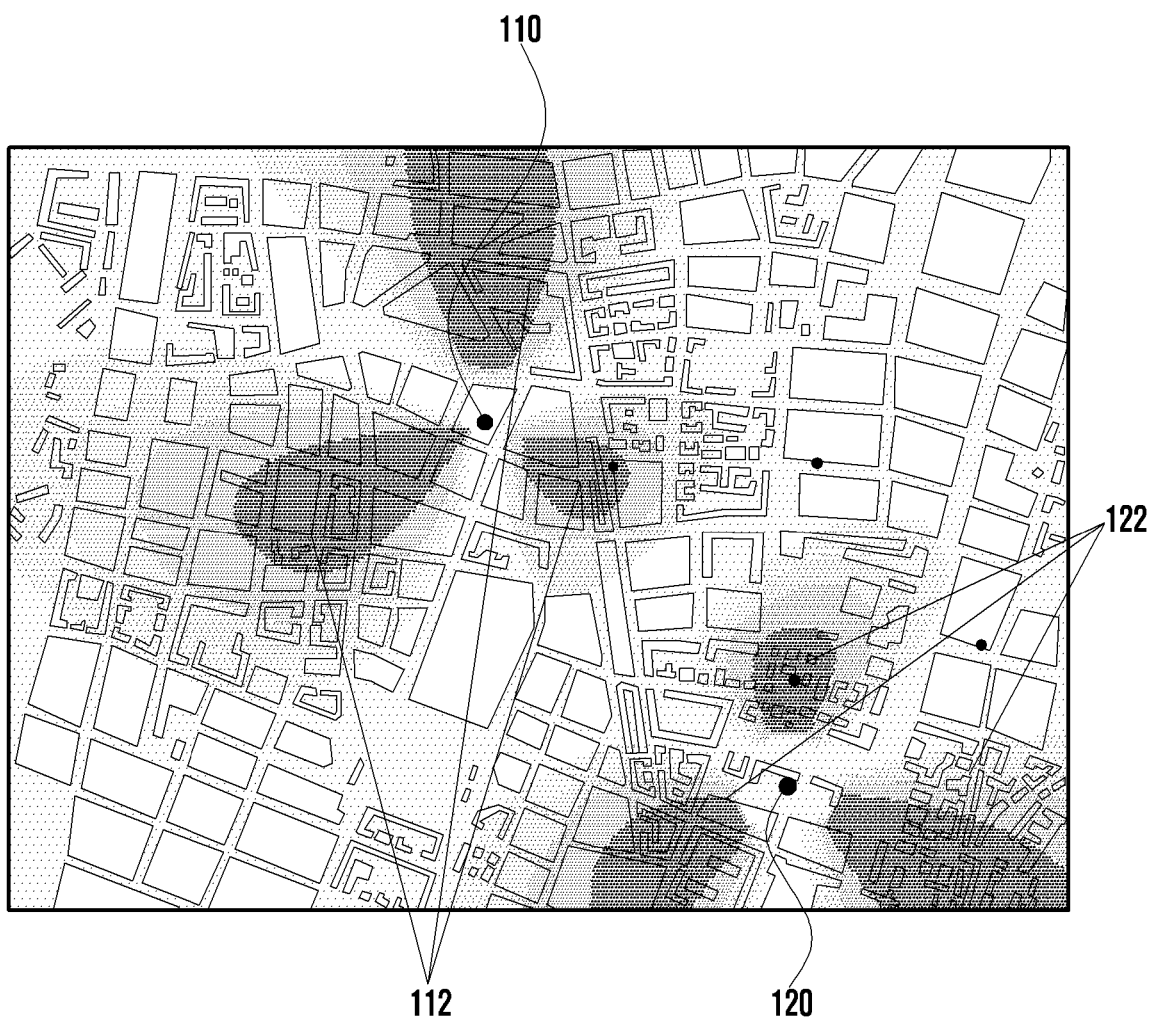
FIG. 1 illustrates network design using a mathematical modeling technique.

Hereinafter, embodiments of the disclosure are described in detail with reference to the accompanying drawings.

Descriptions of functions and structures well known in the art and not directly related to the disclosure may be omitted for clarity and conciseness without obscuring the subject matter of the disclosure.

In the drawings, some elements are exaggerated, omitted, or only outlined in brief, and thus may be not drawn to scale. The same or similar reference symbols are used throughout the drawings to refer to the same or like parts.

The aspects, features, and advantages of certain embodiments of the disclosure will be more apparent from the following detailed description taken in conjunction with the accompanying drawings. The description of the various embodiments is to be construed as exemplary only and does not describe every possible instance of the disclosure. It should be apparent to those skilled in the art that the following description of various embodiments of the disclosure is provided for illustrative purposes only and not for the purpose of limiting the disclosure as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module", or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose large components and units. Components and units may be configured to drive a device or one or more processors in a secure multimedia card.

In a drawing depicting a method for an embodiment, the order in which steps or operations are listed does not necessarily correspond to the order in which they are performed, and two steps listed in sequence may be executed in reverse order or executed in parallel. Also, the steps not mentioned as essential in an embodiment may be selectively performed.

Figure 2:
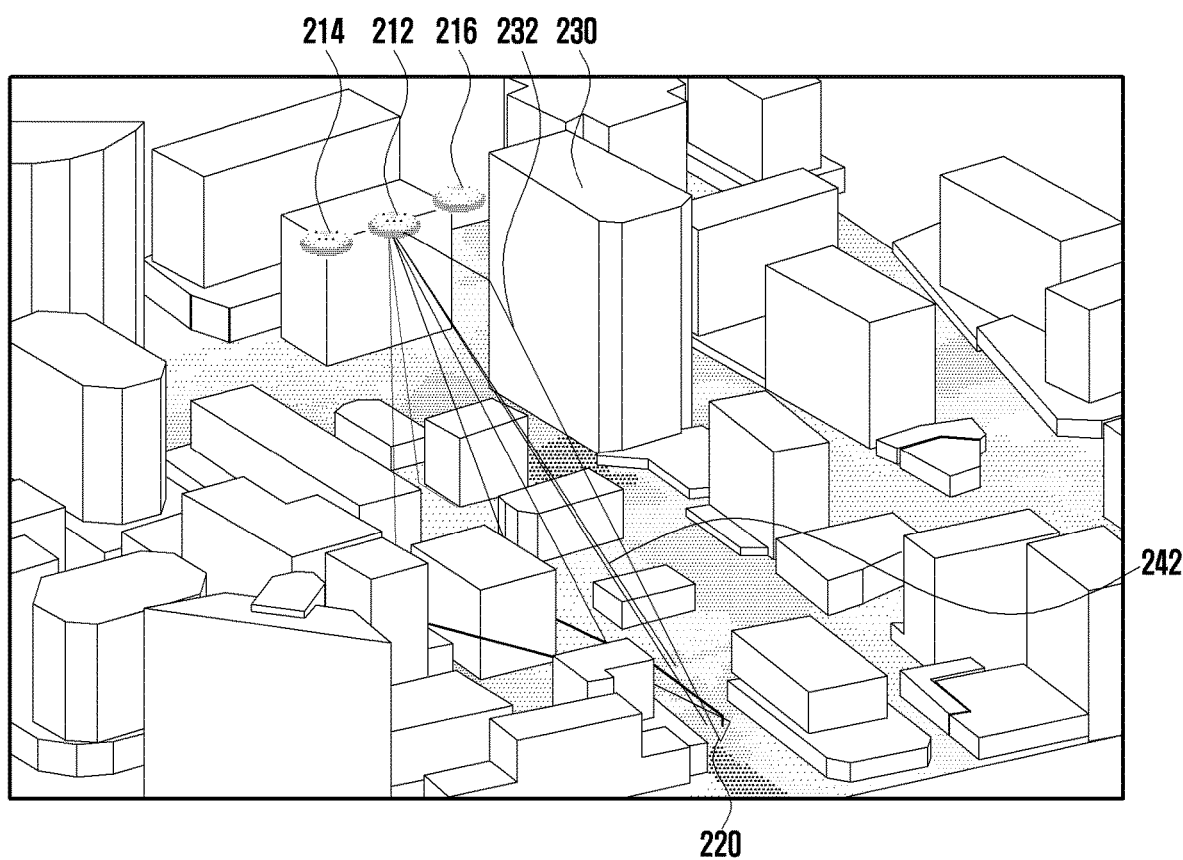
FIG. 2 illustrates a ray tracing simulation scheme according to an embodiment of the disclosure.

FIG. 2 illustrates a ray tracing simulation scheme according to an embodiment of the disclosure.

In FIG. 2, it is assumed that one or more transmitters 212, 214 and 216 transmit signals, and the strength of the signals transmitted by the transmitters 212, 214 and 216 is represented in light and shade on the map. The darker shade indicates stronger signal strength, and the lighter shade indicates weaker signal strength.

More specifically, based on the location of the receiver 220, it is possible to determine the reception strength of the signal in the corresponding region. It is also possible to identify the transmission channel for each possible path from one transmitter 212 to the receiver 220. There may be a signal 242 that is directly received by the receiver 220 from the transmitter 212 and a signal 232 that is reflected by a different object 230 and is received by the receiver 220. By performing a simulation based on ray tracing, it is possible to obtain information about the reception strength of the signals from the transmitters 212, 214 and 216 in a specific region and the propagation paths of the signals. When determining the signal reception strength along the propagation path of the signal, the receiver 220 can obtain more accurate signal reception information if at least one of the surface material or the external shape of the signal reflecting object is considered. Here, the surface material does not only mean the outer surface of the object but also may include the inner material that may affect the reflection of the radio wave. Such information can be used to more accurately estimate the characteristics of radio wave reflection.

In addition, a radio wave-transmissible obstacle may be located on the path along which the signal is directly transmitted. An example of such an obstacle may be a tree. An obstacle that can transmit the radio wave but causes signal attenuation like a tree can be considered in the ray tracing simulation. More accurate simulation results can be obtained by considering information about the obstacles capable of transmitting the radio wave. Here, the tree is an example of an obstacle that is located on the signal propagation path and causes signal attenuation during radio wave transmission, and the obstacle may be a plant or a structure installed on the propagation path and may also be a different object that may cause signal attenuation.

By performing a ray tracing simulation in this way, at least one of the optimum transmitter position or the optimum receiver position can be determined on the map. According to an embodiment, the ray tracing simulation may be performed in consideration of a plurality of transmitter position candidates and receiver position candidates, and it is possible to determine at least one of the transmitter position or the receiver position according to the ray tracing results.

In this manner, the ray tracing simulation can be used to determine the transmission channel for each of the paths through which the RF signal passes, and predict RF signal information at the position of the receiver 220 based on the simulation results. In the process of determining the channel environment along the signal path, the ray tracing simulation may calculate at least one of the signal propagation distance, the environment of a path (e.g., type of the medium), and the effects of reflection and diffraction caused by the 3D terrain or buildings, thereby producing more accurate RF signal information. Additionally, the above channel estimation technique does not have any limitation due to the frequency of the RF signal, can accurately reflect the actual environment, and can be used to determine at least one of the optimal transmission position or the optimal reception position based on the simulation results.

5G networks use very high frequency signals of 28 to 60 GHz. Hence, it is possible to improve accuracy in 5G network design by using a ray tracing simulation technique, not a mathematical modeling technique, to obtain radio signal information. In the ray tracing simulation, to estimate the reflected path of the radio wave due to a building, the reflection effect may be calculated by assuming that the surfaces of all buildings have the same RF characteristics. However, since the reflectance of the RF signal differs depending on the surface material, external shape and pattern of the reflection surfaces, this assumption does not guarantee accurate simulation results. Therefore, a ray tracing technique considering this information is required.

Figure 3A:
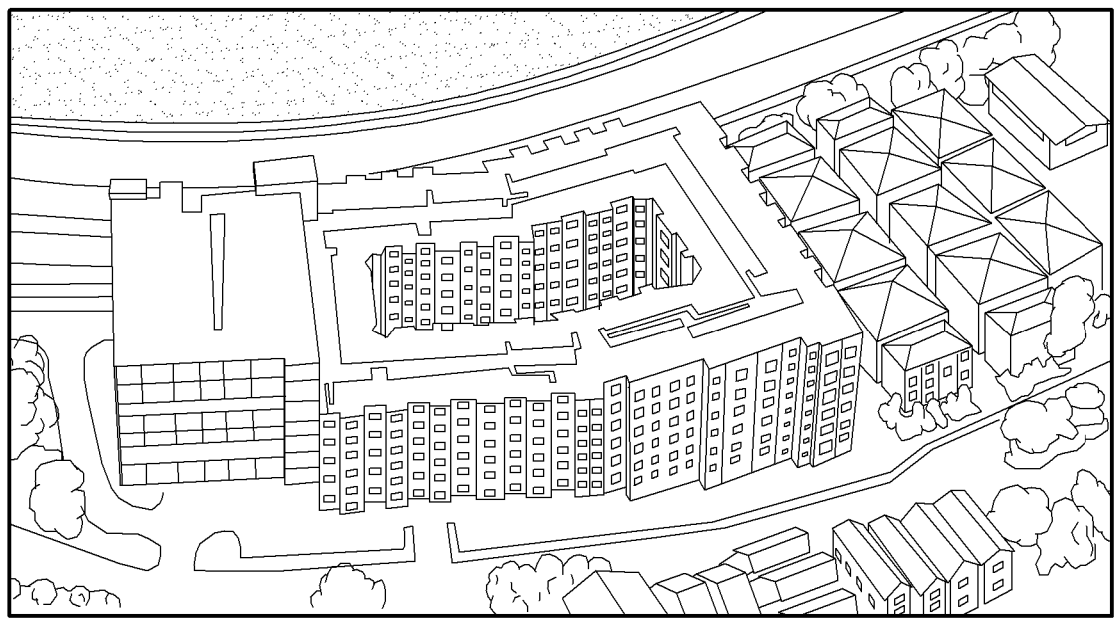
FIGS. 3A and 3B illustrate a scheme for obtaining three-dimensional map information according to an embodiment of the disclosure.
Figure 3B:
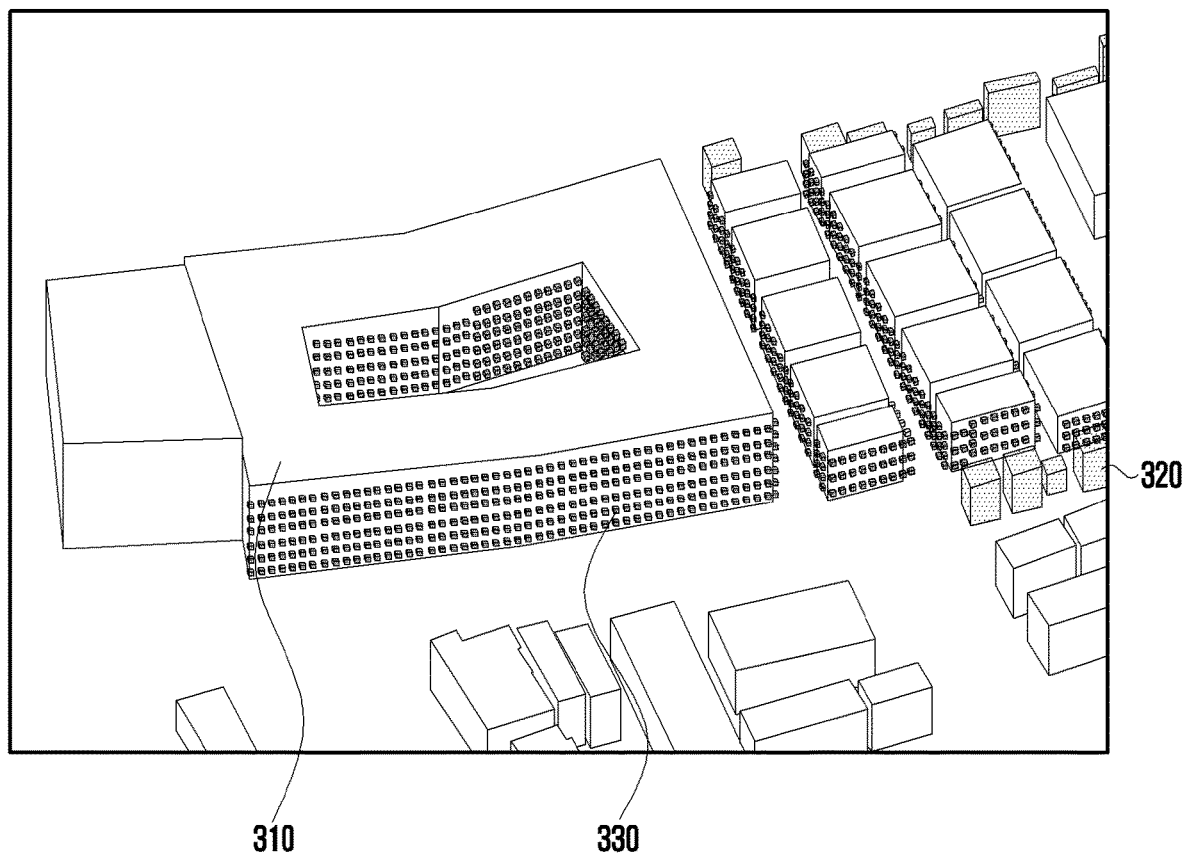

FIGS. 3A and 3B illustrate a scheme for obtaining three-dimensional map information according to an embodiment of the disclosure.

With reference to FIGS. 3A and 3B, three-dimensional map information can be obtained based on the actual image information of FIG. 3A and the location information corresponding to the image information. More specifically, the 3D map information of FIG. 3B can be obtained so that the ray tracing simulation can be performed based on the image information.

The obtained map information of FIG. 3B may include buildings 310, receiver candidate regions 330, and trees 320. Thus, the transmitter position candidates and the receiver position candidates can be determined based on the obtained map information, and the ray tracing simulation can be performed to determine at least one of the optimum transmitter position or the optimum receiver position.

In one embodiment, objects such as a building 310 may have the characteristics of reflecting or scattering radio waves. In this case, more precise simulation results can be obtained by considering the surface material and external shape thereof.

In one embodiment, in the case of a tree 320, although the radio wave can be transmitted, the transmitted radio wave may experience a larger signal attenuation compared with the air. Thus, more accurate simulation results can be obtained by considering the characteristics of the radio wave propagating through an object like the tree 320.

In one embodiment, the receiver candidate region 330 may be selectively considered according to ray tracing and may include a portion where a fixed or mobile receiver can be installed. More specifically, a receiver may be installed at a window portion of the building 310, and the receiver installed in the window portion can perform a relay function in communication between the transmitter outside the building and another receiver inside the building. Thus, by performing the ray tracing simulation in consideration of the receiver candidate region 330, it is possible to obtain a result reflecting a better signal reception environment.

Figure 4A:
FIGS. 4A and 4B illustrate a scheme for obtaining material information of objects in an image using image information according to an embodiment of the disclosure.
Figure 4B:
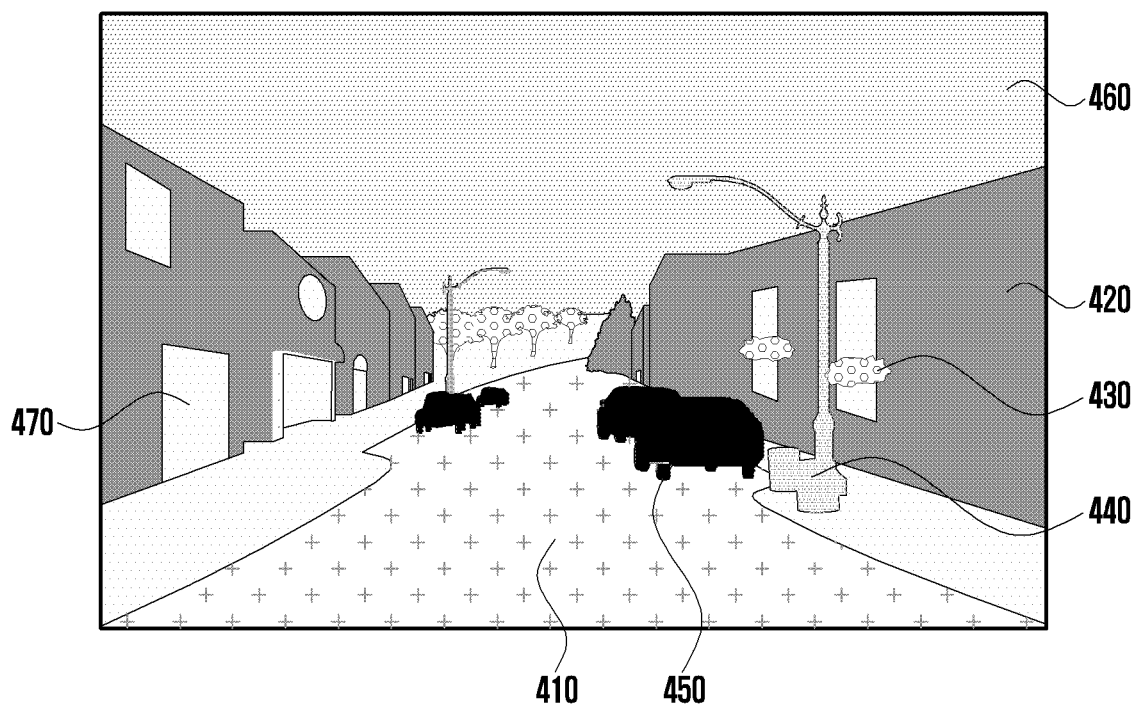

FIGS. 4A and 4B illustrate a scheme for obtaining material information of objects in an image using image information according to an embodiment of the disclosure.

With reference to FIGS. 4A and 4B, the material of an object in the image can be identified from the image information. More specifically, it is possible to identify the material of an object in the image from the image information by use of computer vision technology based on deep learning. More specific features related to deep learning-based computer vision technology will be described later.

In one embodiment, the result of FIG. 4B can be obtained by analyzing the image information of FIG. 4A. Here, each element can be identified based on at least one of color, contrast, reflectance, mutual positional relationship between elements, or arrangement of all the elements, represented in the image. For example, image analysis can be used to identify the material of elements such as asphalt 410, concrete 420, plant 430, steel structure 440, vehicle 450, sky 460, and glass 470. As such, the material of the elements represented in the image may be determined based on the image information, and more accurate results can be obtained by reflecting the material characteristics in the ray tracing simulation.

Figure 5:
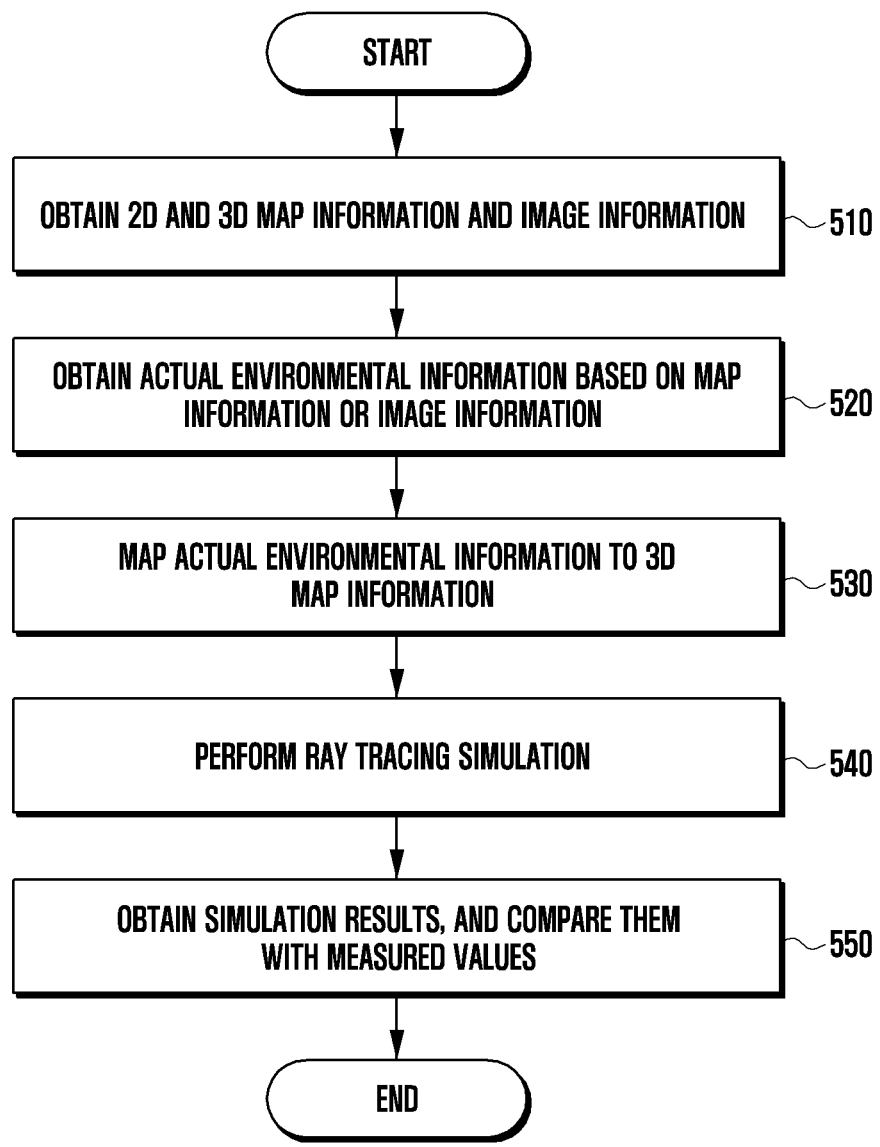
FIG. 5 describes a method for analyzing communication channel environments through ray tracing according to an embodiment of the disclosure.

FIG. 5 describes a method for analyzing communication channel environments through ray tracing according to an embodiment of the disclosure.

A description is given of a method for performing a ray tracing simulation with reference to FIG. 5. In one embodiment, the ray tracing simulation may be performed by a computing device including a controller. The computing device may be a device including a central control processor, and may be a personal computer, a workstation, or the like. In the following description, it may be assumed that the simulation is performed by a computing device.

At step 510, the computing device can obtain two-dimensional image information and three-dimensional map information. In one embodiment, the two-dimensional image information may include additional information corresponding to the image, and the additional information may include shooting information about the position, direction, and angle of view at which the image is captured. The three-dimensional map information corresponding to the two-dimensional image information can be identified based on the additional information. The three-dimensional map information may include position information and corresponding three-dimensional information. Such information may include information about the shapes of buildings, structures, and plants on the ground surface or water surface, and may further include information about at least one of transmitter position candidates or receiver position candidates according to an embodiment.

At step 520, the computing device may obtain actual environmental information based on at least one of the map information or the image information. The actual environmental information may include information about objects and characteristics thereof located on the communication path. More specifically, the two-dimensional image information can be analyzed to identify the characteristics of objects that can be located on the communication path. The characteristics of an object may include at least one of the surface material of the object or the external shape of the object. In the case of an object capable of transmitting the radio wave, the characteristics of the object may include information about the shape of the object and the degree of signal attenuation during transmission.

At step 530, the computing device may map the actual environmental information of the communication path to the three-dimensional map information based on the information obtained at steps 510 and 520. In this mapping, the additional information obtained from the two-dimensional image information may be mapped to the object corresponding to the three-dimensional map information based on the additional information included in the two-dimensional image information.

At step 540, the computing device may perform a ray tracing simulation based on the information generated at step 530. In one embodiment, the ray tracing simulation may be performed while changing the beam information in sequence with respect to the beam in a specific direction, or may be performed by assuming that beams in all directions that can be transmitted by the transmitter are transmitted within the same time period. Through the ray tracing simulation, it is possible to predict and analyze the quality of the signal that can be received by the receiver in consideration of the path through which the signal is transmitted from the transmitter to the receiver and the actual environmental information along the path. In one embodiment, during the ray tracing simulation, at least one of the transmitter position or the receiver position may be determined based on the three-dimensional map information, and the signal transmission environment can be identified based on the information mapped at step 530.

At step 550, the computing device may obtain the simulation results, and may continue the ray tracing simulation according to the value obtained through the simulation and the value obtained through measurement in the actual environment. More specifically, if the simulation result value is different from the measurement value, the computing device may newly generate the simulation result value by changing the information obtained at step 520 based on the actual measurement value. In this way, the ray tracing simulation may be performed by reflecting the actual environmental information on the three-dimensional map, enabling a more reliable analysis of the communication channel. For example, a transmitter and a receiver may be directly installed in the region for the ray tracing simulation, and the signal transmitted from the transmitter to the receiver may be measured. This measurement result can be added to the basic information for carrying out the ray tracing simulation, updating the basic information.

As described above, to provide a wireless service to a specific region in the map, it is possible to determine at least one of the optimal transmitter position or the optimal receiver position based on the ray tracing simulation results. Effective network design can be performed through determining at least one of the optimal transmitter position or the optimal receiver position. For example, it is possible to determine an optimum base station position for effectively providing radio signals to wireless terminals in a specific region. By determining the optimal base station position, it is possible to effectively provide services with a smaller number of base station installations.

In addition, adaptive network management can be possible by use of information on signal reception measured in an actual environment. More specifically, when there is a change in the surrounding environment after the transmitter is installed, an additional ray tracing simulation may be performed in consideration of the changed environment. Network management may be performed by adjusting the transmitter position based on the simulation results. In addition to adjusting the transmitter position, the network management may include modifying the information about the beams emitted by the transmitter. For example, the transmitter can determine the transmission beam and the reception beam based on the ray tracing simulation results. Beam alignment may be performed based on the ray tracing simulation results to determine the transmission beam and the reception beam. Such adaptive network management can be performed on a periodic basis.

Figure 6:
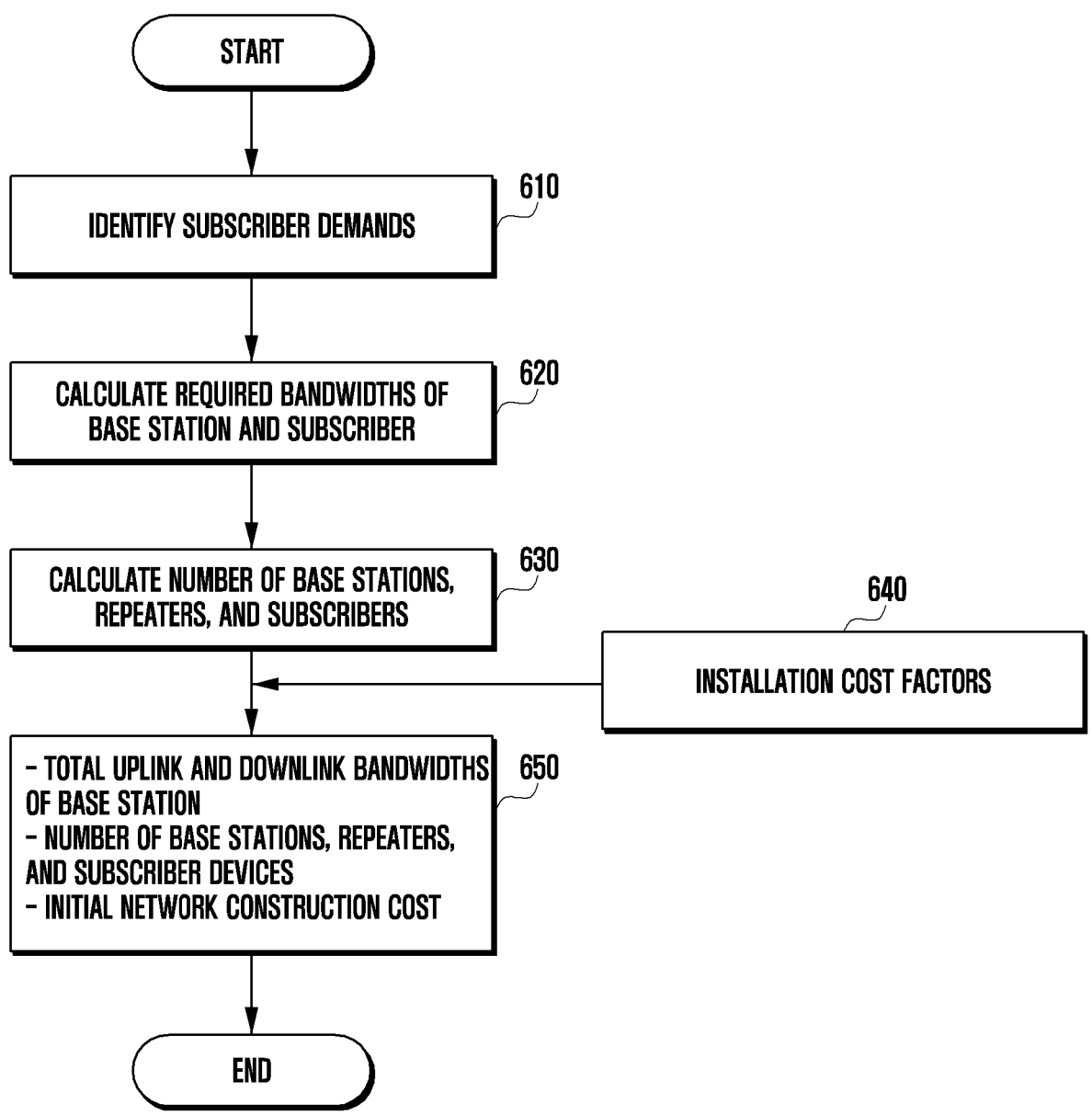
FIG. 6 describes a method of performing network design based on subscriber demands.

FIG. 6 describes a method of performing network design based on subscriber demands.

In the existing network design, business feasibility analysis is carried out by calculating the network construction cost for a wide range (km unit) based on the population density (e.g., number of subscribers). In the existing network design method with reference to FIG. 6, the subscriber demand may be calculated at step 610, and the required bandwidth of the base station or subscriber may be calculated at step 620.

The number of base stations, repeaters, and subscribers is calculated at step 630, and the installation cost factors can be identified at step 640. At step 650, the total uplink and downlink bandwidths of the base station, the number of base stations, repeaters, and subscriber devices, and the initial network construction cost may be calculated or predicted.

Figure 7:
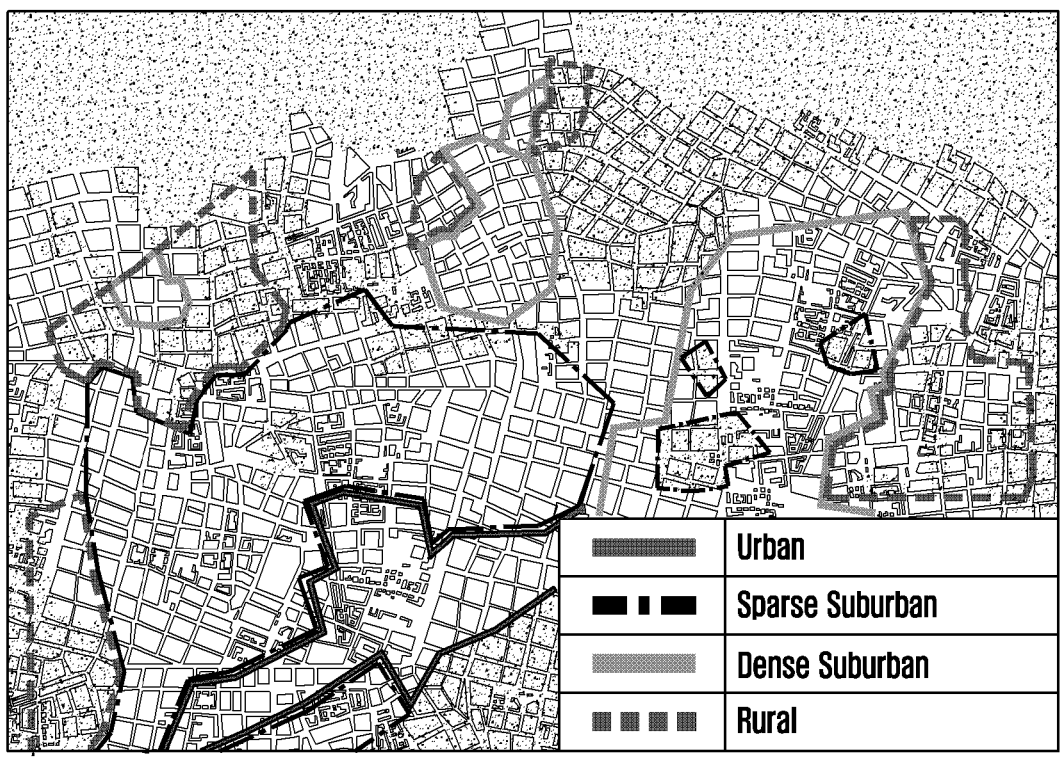
FIG. 7 illustrates demarcation of regions during network design according to the method of FIG. 6.

FIG. 7 illustrates demarcation of regions during network design according to the method of FIG. 6. With reference to FIG. 7, according to the network design method based on the population density (or, subscriber demands), the design regions on the map may be divided into urban regions, sparse suburban regions, dense suburban regions, and rural regions.

However, in the 5G network design, due to the characteristics of millimeter wave (mmWave) propagation (e.g., strong line-of-sight propagation), it is difficult to achieve the reliability of the existing feasibility analysis for a large area (km unit) based on the population density.

Accordingly, the disclosure proposes a method for achieving the reliability of the business feasibility analysis by narrowly dividing the area (in units of meters) in consideration of the actual environmental factors affecting the millimeter wave (mmWave) propagation.

For example, in the case of 4G, as the radio unit (RU) has a wide coverage and is capable of penetrating the building, the building layout need not be considered. However, in the case of 5G, as the radio unit has a narrow coverage and is incapable of penetrating the building, a design taking into account the building layout is needed.

Figure 8:
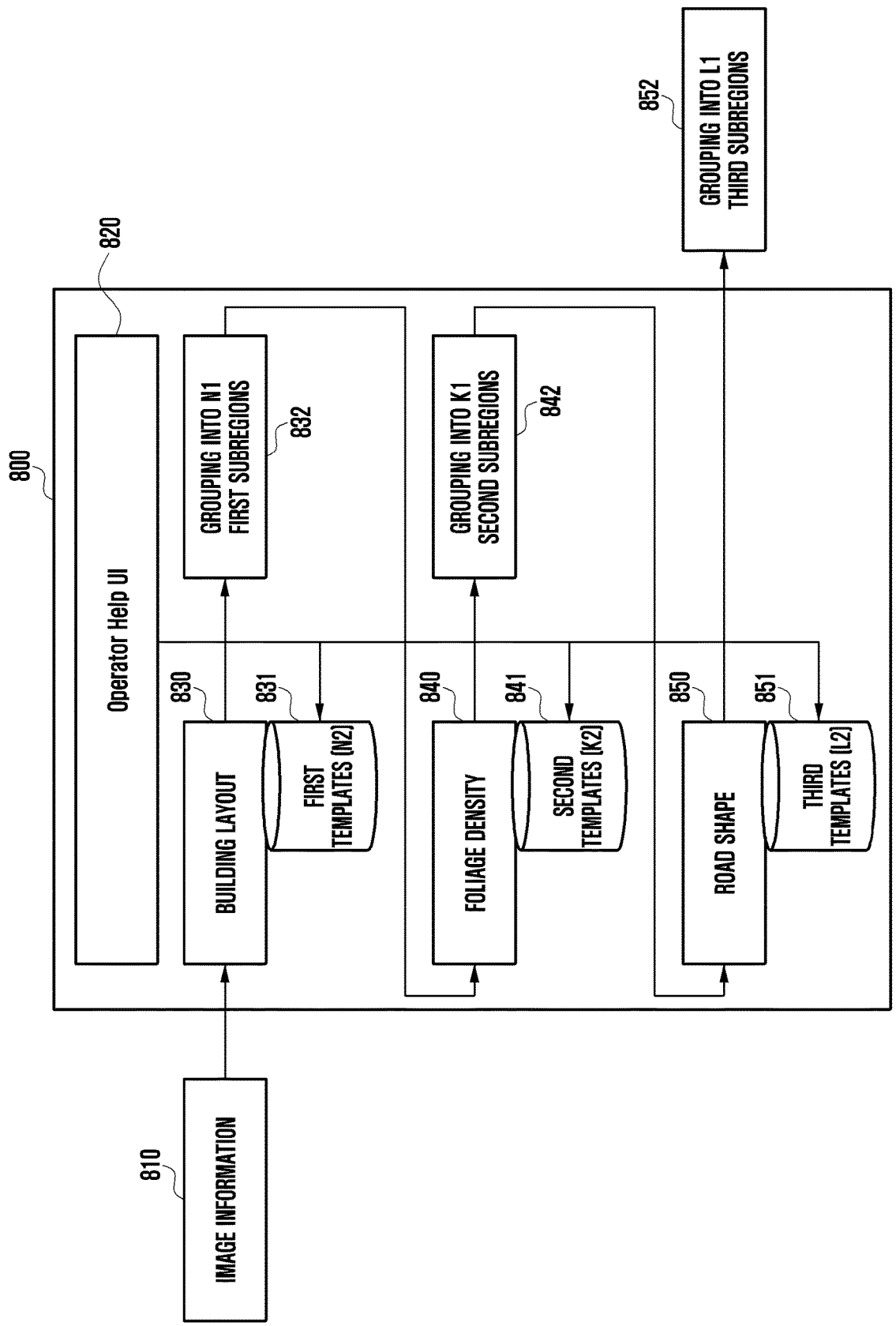
FIG. 8 is a diagram depicting a process of performing network design according to an embodiment of the disclosure.

FIG. 8 is a diagram depicting a process of performing network design according to an embodiment of the disclosure.

According to an embodiment of the disclosure, a network design method for a wireless communication system may include: configuring at least one environmental factor related to millimeter wave (mmWave) propagation based on image information 810 in a map; grouping design regions into one or more subregions based on the at least one environmental factor; and performing network design according to the grouped subregions.

Here, the image information 810 may be determined based on at least one of two-dimensional map information or three-dimensional map information. For example, the image information 810 may be extracted from aerial photographs through a deep learning based computer vision technique.

The at least one environmental factor may include a factor that can affect millimeter wave propagation in network design, and may include various environmental factors according to design specifications in addition to those factors illustrated in the disclosure. Here, the at least one environmental factor may include first characteristic information of a first object and second characteristic information of a second object.

In one embodiment, the network design method may include grouping the design regions into first subregions based on the first characteristic information, and grouping the first subregions into second subregions based on the second characteristic information.

The design regions may be grouped into the first subregions according to at least one template for the first object, and the first subregions may be grouped into the second subregions according to at least one template for the second object. Here, the at least one template for the first object may be determined based on the first characteristic information, and the at least one template for the second object may be determined based on the second characteristic information.

With reference to FIG. 8, the grouping of subregions can be performed using an operator help user interface (UI) 800 during network design.

In FIG. 8, for ease of description, it is assumed that the building layout 830, the foliage density 840, and the road shape 850 are selected as at least one environmental factor related to millimeter wave propagation.

According to an embodiment of the disclosure, the network design apparatus can group the design regions in the map into N1 first subregions (N1 is a natural number) based on the building layout 830 (832).

Here, the apparatus may configure in advance N2 first templates 831 (N2 is a natural number greater than or equal to N1) for the building layout 830, and may group the design regions in the map into the N1 first subregions according to the N2 first templates 831 (832). For example, the first templates 831 may correspond to the cases where the building layout 830 is of a 'ㄷ' shape, a 'ㅅ' shape, a 'ㅁ' shape, and a '- -' shape.

In the description, the design regions refer to an area where the user wishes to design a network in the entire map, and may correspond to the whole or a portion of the map.

Thereafter, the apparatus may group the first subregions into K1 second subregions (K1 is a natural number) based on the foliage density 840 (842).

Here, the apparatus may configure in advance K2 second templates 841 (K2 is a natural number) for the foliage density 840, and may group the first subregions into the K1 second subregions according to the K2 second templates 841

(842). For example, the second templates 841 may correspond to the cases where the foliage density 840 is "high", "middle", and "low".

Thereafter, the apparatus may group the second subregions into L1 third subregions (L1 is a natural number) based on the road shape 850 (852).

Here, the apparatus may configure in advance L2 third templates 851 (L2 is a natural number) for the road shape 840, and may group the second subregions into the L1 third subregions according to the L2 third templates 851 (852). For example, the third templates 851 may correspond to the cases where the road shape 840 is "straight", "curved", and "mixed".

Then, the apparatus may identify the characteristics of the signal transmitted from the transmission point to the reception point in the wireless communication system based on the third subregions, and design a network of the wireless communication system based on the identified signal characteristics. The apparatus can efficiently perform network design by grouping the design regions in the map into the third subregions.

Figure 9:
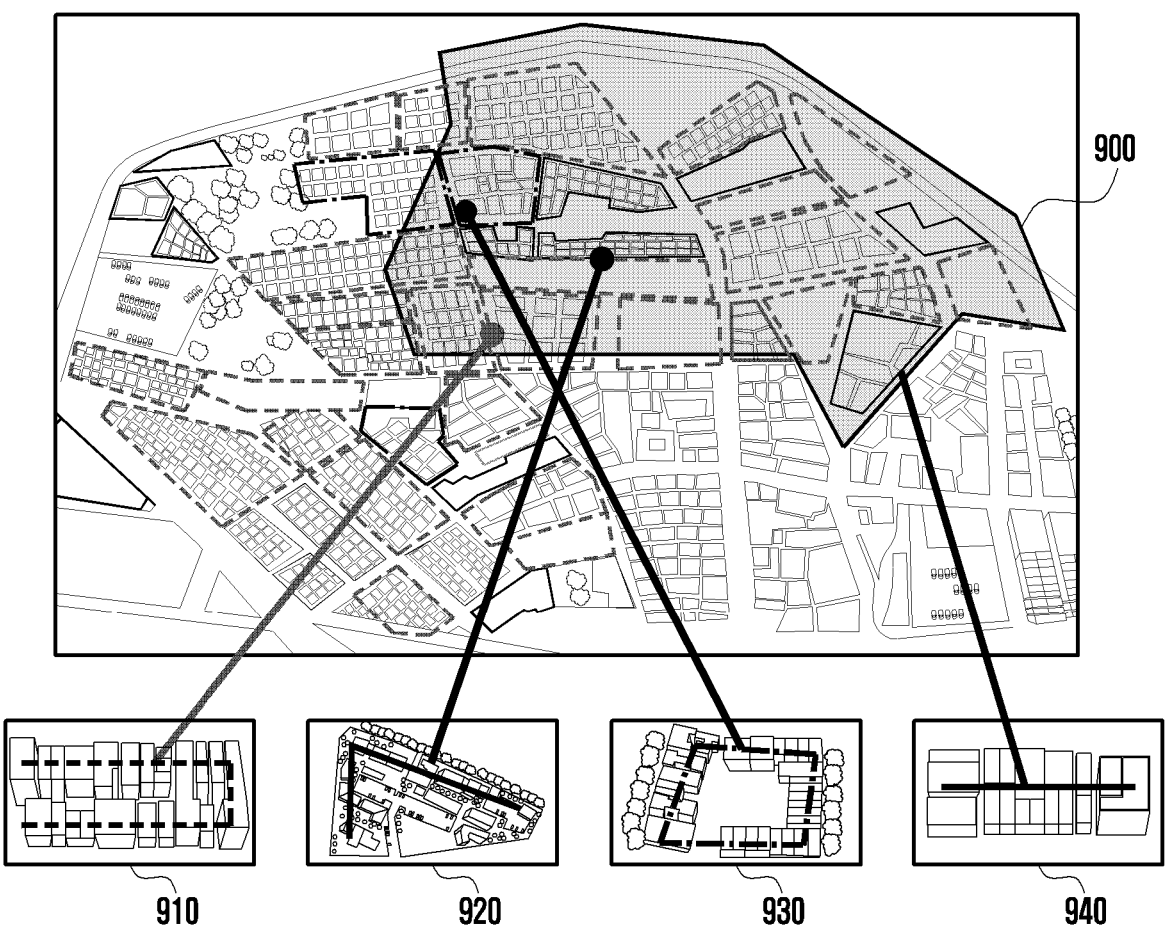
FIG. 9 depicts a mapping between the building layout and the design region according to an embodiment of the disclosure.

FIG. 9 depicts a mapping between the building layout and the design region according to an embodiment of the disclosure.

With reference to FIG. 9, when the building layout is selected as an environmental factor related to millimeter wave propagation, the design region 900 in the map can be divided and grouped into subregions according to the four templates 910 to 940 for the building layout.

Figure 11:
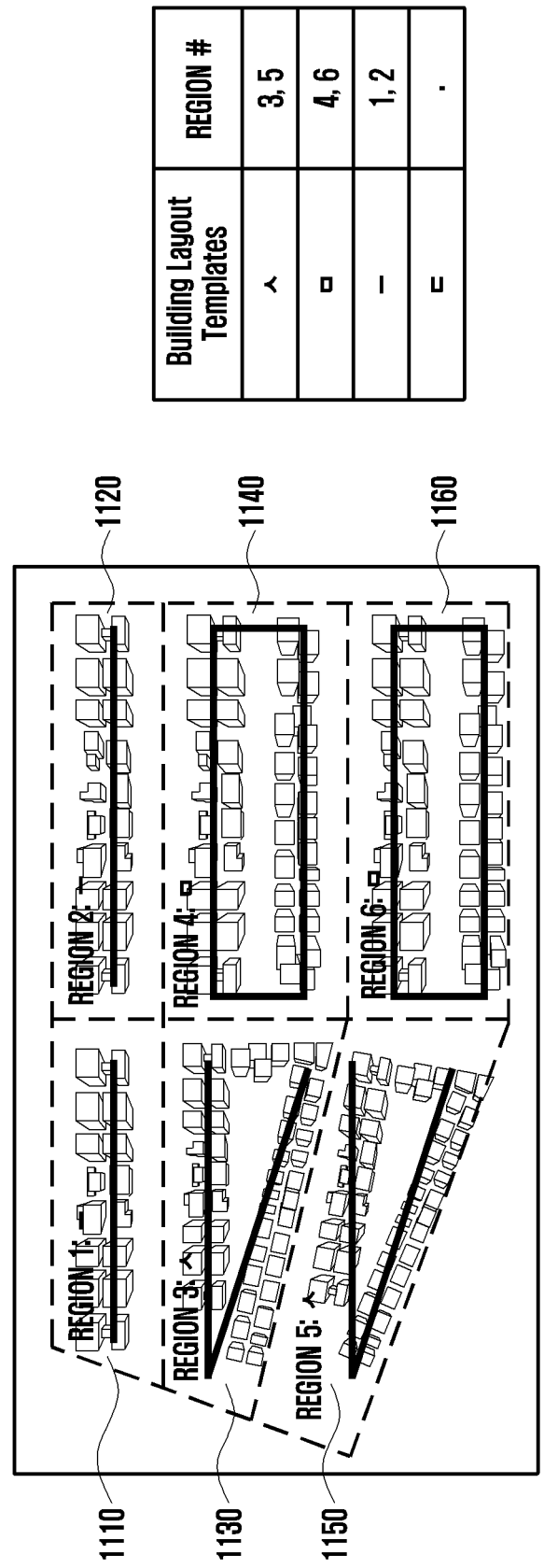
FIG. 11 illustrates a process of grouping design regions based on the building layout templates shown in FIG. 10.

FIG. 10 illustrates templates of the building layout according to an embodiment of the disclosure. FIG. 11 illustrates a process of grouping design regions based on the building layout templates shown in FIG. 10.

With reference to FIG. 10, the templates of the building layout may include a first template 1010 in a ' ⊏ ' shape, a second template 1020 in a ' ⋏ ' shape, a third template 1030 in a ' ⊔ ' shape, and a fourth template 1040 in a ' - ' shape.

With reference to FIGS. 10 and 11, the design region may be divided into plural regions 1110 to 1160, which may then be grouped according to the templates 1010 to 1040 for the building layout. For example, the third region 1130 and the fifth region 1150 may be grouped by the ' ⋏ '-shaped second template 1020, the fourth region 1140 and the sixth region 1160 may be grouped by the ' ⊔ '-shaped third template 1030, and the first region 1110 and the second region 1120 may be grouped by the ' — '-shaped fourth template 1040.

Figure 12:
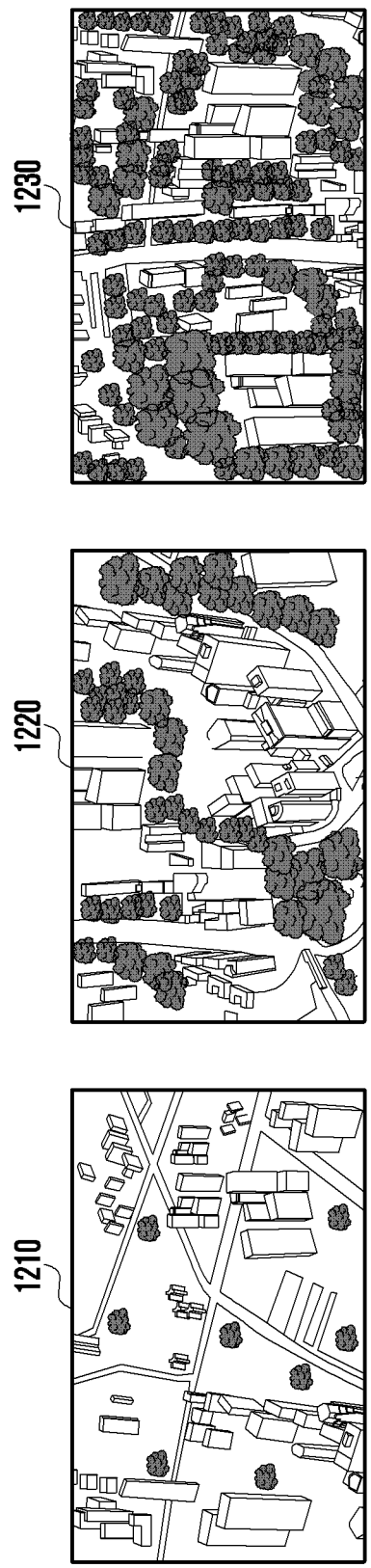
FIG. 12 illustrates templates of the foliage density according to an embodiment of the disclosure.
Figure 13:
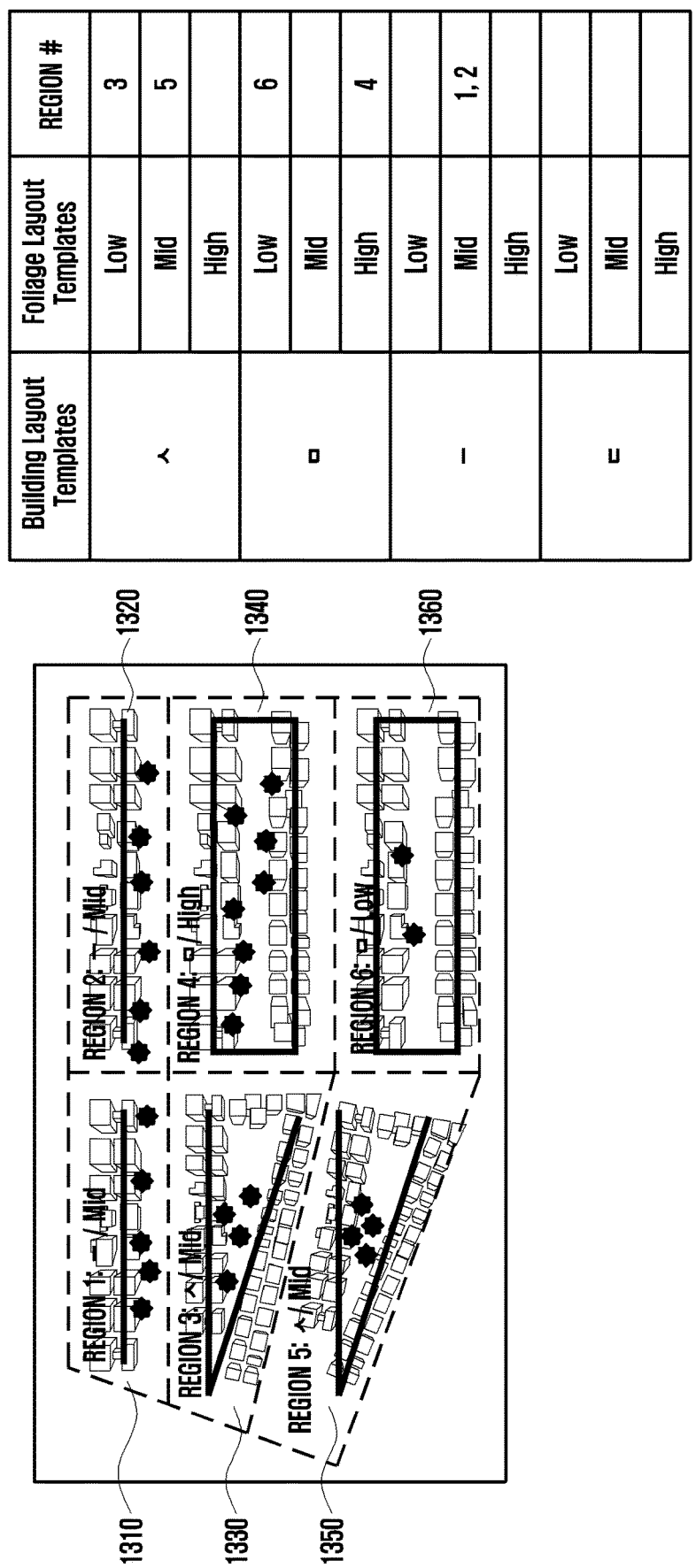
FIG. 13 illustrates a process of grouping design regions further by considering the foliage density templates shown in FIG. 12.

FIG. 12 illustrates templates of the foliage density according to an embodiment of the disclosure. FIG. 13 illustrates a process of grouping design regions further by considering the foliage density templates shown in FIG. 12.

With reference to FIG. 12, the templates of the foliage density may include a "low"-density first template 1210, a "middle"-density second template 1220, and a "high"-density third template 1230.

With reference to FIGS. 10 to 13, the design region may be divided into plural regions 1310 to 1360, which may then be grouped according to the templates 1010 to 1040 for the building layout and the templates 1210 to 1230 for the foliage density. For example, the third region 1130 may be grouped by the "low"-density first template 1210 for the foliage density and the ' ⋏ '-shaped second template 1020, and the fifth region 1150 may be grouped by the "middle"-density second template 1220 for the foliage density and the ' ⋏ '-shaped second template 1020.

Figure 14:
FIG. 14 illustrates templates of the road shape according to an embodiment of the disclosure.
Figure 15A:
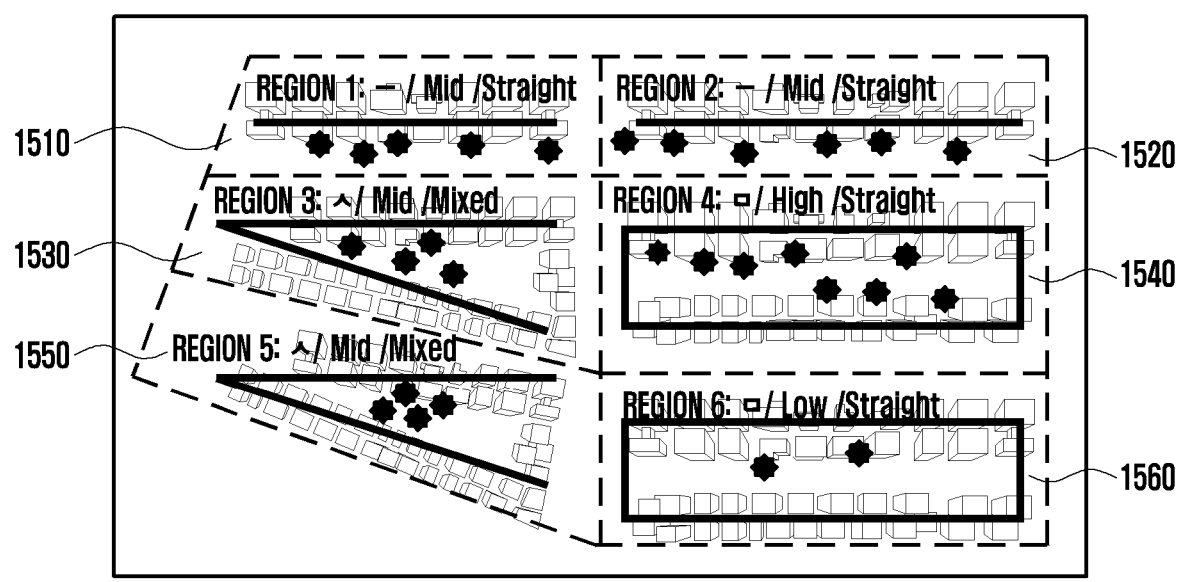

FIG. 14 illustrates templates of the road shape according to an embodiment of the disclosure. FIGS. 15A and 15B illustrate a process of grouping design regions further by considering the road shape templates shown in FIG. 14.

With reference to FIG. 14, the templates for the road shape may include a first template 1410 being "straight", a second template 1420 being "curved", and a third template 1430 being "mixed".

With reference to FIGS. 10 to 15A, the design region may be divided into plural regions 1510 to 1560, which may then be grouped according to the templates 1010 to 1040 for the building layout, the templates 1210 to 1230 for the foliage density, and the templates 1410 to 1430 for the road shape.

For example, with reference to FIG. 15B, the third region 1530 may be grouped by the "mixed"-shaped third template 1430 for the road shape, the "low"-density first template 1210 for the foliage density, and the ' ⋏ '-shaped second template 1020.

Figure 16:
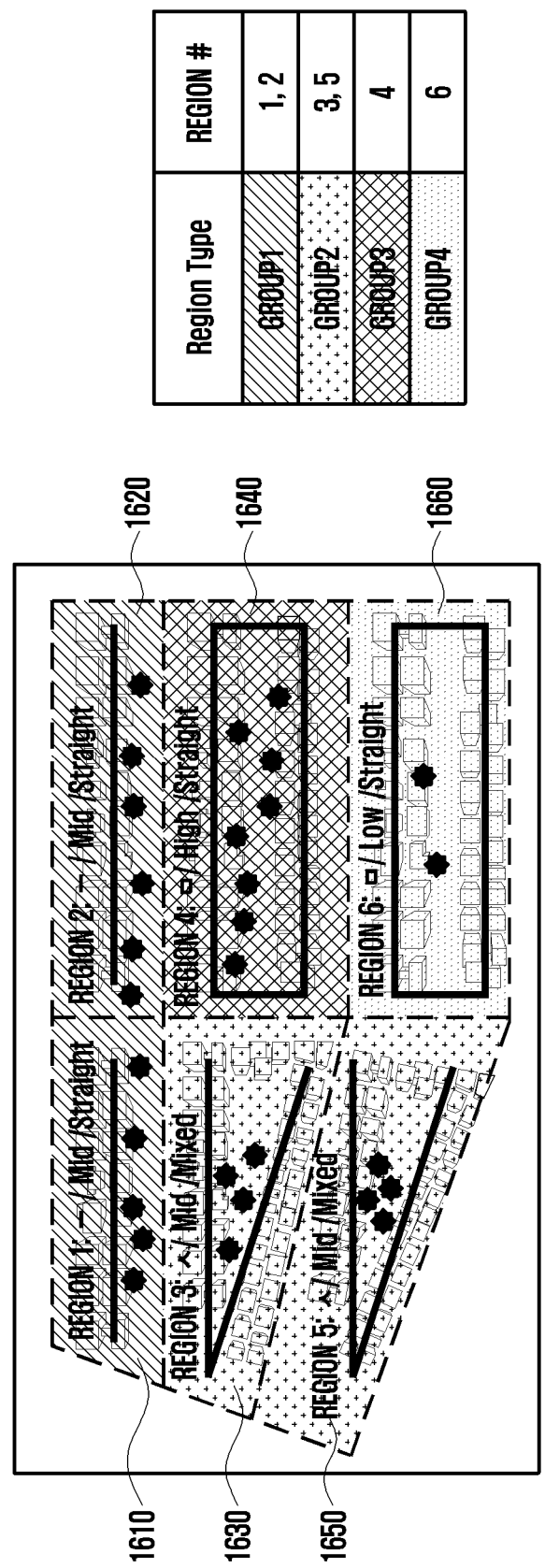
FIG. 16 illustrates a process for determining final regions for network design based on the grouping shown in FIG. 15B.

FIG. 16 illustrates a process for determining final regions for network design based on the grouping shown in FIG. 15B.

With reference to FIGS. 10 to 16, the design region may be divided into plural regions 1610 to 1660, which may then be grouped into four groups (group 1 to group 4) according to the templates 1010 to 1040 for the building layout, the templates 1210 to 1230 for the foliage density, and the templates 1410 to 1430 for the road shape.

Figure 17:
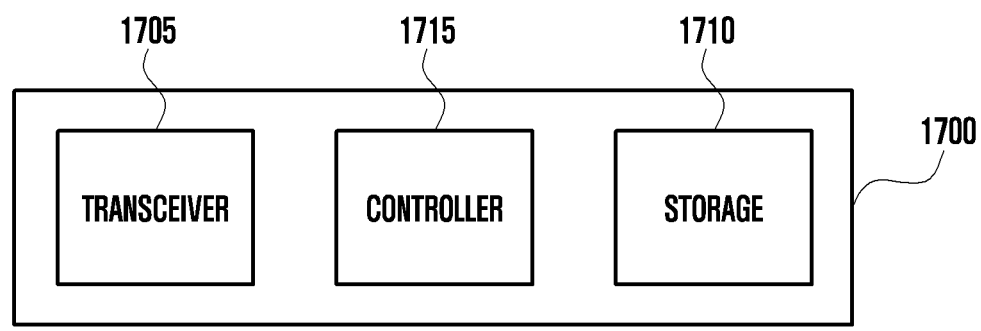
FIG. 17 is a block diagram of an apparatus for performing network design according to an embodiment of the disclosure.

FIG. 17 is a block diagram of an apparatus for performing network design according to an embodiment of the disclosure.

With reference to FIG. 17, according to embodiments of the disclosure, the apparatus 1700 for performing network design in a wireless communication system may include a transceiver 1705, a storage 1710, and a controller 1715.

The transceiver 1705 can transmit and receive signals to and from other devices outside the apparatus 1700. More specifically, the transceiver 1705 can transmit and receive data to and from an external device, and may include an interface for data transmission and reception.

The storage 1710 may store at least one of information related to the apparatus 1700 or information transmitted and received through the transceiver 1705. The storage 1710 may also store all information used in the embodiments herein, such as configuration information about the environmental factors related to millimeter wave propagation, and information about the subregion groupings.

The controller 1715 can control the overall operation of the apparatus 1700, and can control the apparatus to perform operations described in the above embodiments. The controller 1715 may configure at least one environmental factor related to millimeter wave propagation based on image information in a map, group design regions into one or more subregions based on the at least one environmental factor, and perform network design according to the grouped subregions.

The controller 1715 may include at least one processor. The at least one processor may be controlled by a program that includes instructions configured to implement the method described in the embodiments of the disclosure. The program may be stored in a storage medium, which may include volatile or nonvolatile memory. This memory may be a medium capable of storing data, and there is no restriction on the type of the medium if the instructions can be stored.

Hereinabove, embodiments of the disclosure have been described with reference to the accompanying drawings. Specific terms or words used in the description should be construed in accordance with the spirit of the disclosure without limiting the subject matter thereof. It should be understood that many variations and modifications of the basic inventive concept described herein will still fall within the spirit and scope of the disclosure as defined in the appended claims and their equivalents.

The invention claimed is:

1. A method for network design in a wireless communication system, the method comprising:
    configuring at least two environmental factors related to millimeter wave (mmWave) propagation based on image information in a map, wherein the at least two environmental factors include shapes formed by a plurality of buildings, a building layout, a foliage density, and a road shape;
    dividing a design region in the map into one or more subregions based on the shapes formed by the plurality of buildings;
    grouping the one or more subregions based on states of the at least two environmental factors; and
    performing a ray tracing for determining at least one base station position in the design region according to grouped one or more subregions.

2. The method of claim 1, wherein the at least two environmental factors further include first characteristic information and second characteristic information of the shapes formed by the plurality of buildings.

3. The method of claim 2, wherein the dividing of the design region in the map comprises:
    dividing the design region into first subregions and grouping the first subregions based on the first characteristic information; and
    dividing the first subregions into second subregions and grouping the second subregions based on the second characteristic information.

4. The method of claim 3,
    wherein the design region is divided into the first subregions and the first subregions are grouped according to a first template for a first shape of the shapes formed by the plurality of buildings,
    wherein the first subregions are divided into the second subregions and the second subregions are grouped according to a second template for a second shape of the shapes formed by the plurality of buildings,
    wherein the first template is determined based on the first characteristic information, and
    wherein the second template is determined based on the second characteristic information.

5. The method of claim 1, wherein the performing of the network design comprises:
    identifying characteristics of a signal transmitted from a transmission point to a reception point in the wireless communication system based on the grouped one or more subregions; and
    designing a network of the wireless communication system based on the identified characteristics of the signal.

6. The method of claim 1, wherein the image information is determined based on at least one of two-dimensional map information or three-dimensional map information.

7. A non-transitory storage medium storing a program that includes instructions configured to implement the method of claim 1.

8. An apparatus for network design in a wireless communication system, the apparatus comprising:
    a transceiver configured to transmit and receive information; and
    a controller configured to:
        configure at least two environmental factors related to millimeter wave propagation based on image information in a map wherein the at least two environmental factors include shapes formed by a plurality of buildings, a building layout, a foliage density, and a road shape,
        divide a design region in the map into one or more subregions based on the shapes formed by the plurality of buildings,
        group the one or more subregions based on states of the at least two environmental factors, and
        perform a ray tracing for determining at least one base station position in the design region according to grouped one or more subregions.

9. The apparatus of claim 8, wherein the at least one of the two environmental factors further include first characteristic information and second characteristic information of the shapes formed by the plurality of buildings.

10. The apparatus of claim 9, wherein the controller is further configured to:
    divide the design region into first subregions and group the first subregions based on the first characteristic information, and
    divide the first subregions into second subregions and group the second subregions based on the second characteristic information.

11. The apparatus of claim 10,
    wherein the controller is further configured to:
        divide the design region into the first subregions and group the first subregions according to a first template for a first shape of the shapes formed by the plurality of buildings, and
        divide the first subregions into the second subregions and group the second subregions according to a second template for a second shape of the shapes formed by the plurality of buildings,
    wherein the first template is determined based on the first characteristic information, and
    wherein the second template is determined based on the second characteristic information.

12. The apparatus of claim 8, wherein the controller is further configured to:
    identify characteristics of a signal transmitted from a transmission point to a reception point in the wireless communication system based on the grouped one or more subregions, and
    design a network of the wireless communication system based on the identified characteristics of the signal.

13. The apparatus of claim 8, wherein the image information is determined based on at least one of two-dimensional map information or three-dimensional map information.

* * * * *